(12) United States Patent
Witkowski et al.

(45) Date of Patent: Jun. 18, 2013
(10) Patent No.: US 8,465,001 B2

(54) PLUG VALVE INDICATOR

(75) Inventors: Brian C. Witkowski, Weatherford, TX (US); Edward C. Kotapish, Willow Park, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 464 days.

(21) Appl. No.: 12/793,194

(22) Filed: Jun. 3, 2010

(65) Prior Publication Data
US 2010/0308246 A1    Dec. 9, 2010

Related U.S. Application Data

(60) Provisional application No. 61/183,617, filed on Jun. 3, 2009.

(51) Int. Cl.
 *F16K 35/00* (2006.01)

(52) U.S. Cl.
 USPC .......... 251/89; 251/249.5; 251/288; 251/292; 137/556.3

(58) Field of Classification Search
 USPC ............. 251/249.5, 292, 286, 288, 89, 93, 251/101; 137/556, 556.3; 116/277; 74/625
 See application file for complete search history.

(56) References Cited

U.S. PATENT DOCUMENTS

| | | | |
|---|---|---|---|
| 1,764,936 A * | 6/1930 | Dean | 192/150 |
| 1,798,498 A * | 3/1931 | Riley | 137/246.13 |
| 1,990,090 A * | 2/1935 | Packard | 251/81 |
| 3,064,940 A | 11/1962 | Anderson | |
| 4,085,770 A * | 4/1978 | Woronowicz | 137/238 |
| 4,093,180 A * | 6/1978 | Strabala | 251/248 |
| 4,327,768 A | 5/1982 | Behle | |
| 4,448,148 A | 5/1984 | Gain | |
| 4,497,344 A * | 2/1985 | Kisiel | 137/797 |
| 4,511,120 A | 4/1985 | Conley et al. | |
| 4,616,803 A * | 10/1986 | Schils | 251/14 |
| 4,848,398 A * | 7/1989 | Leach | 137/556.3 |
| 4,969,482 A | 11/1990 | Perrin et al. | |
| 5,178,185 A * | 1/1993 | Stehling et al. | 137/543 |
| 5,477,752 A * | 12/1995 | West et al. | 74/625 |
| 5,544,675 A * | 8/1996 | Dean | 137/797 |
| 5,755,427 A * | 5/1998 | Koskinas | 251/188 |
| 6,003,837 A * | 12/1999 | Raymond et al. | 251/129.12 |
| 6,382,247 B1 * | 5/2002 | Gundry | 137/556.3 |
| 7,516,941 B2 * | 4/2009 | Combs | 251/292 |
| 7,819,386 B2 * | 10/2010 | Combs | 251/292 |

\* cited by examiner

*Primary Examiner* — John K Fristoe, Jr.
*Assistant Examiner* — Marina Tietjen
(74) *Attorney, Agent, or Firm* — Bracewell & Giuliani, LLP

(57) ABSTRACT

A valve has a body having a rotatable valve element. A drive mechanism has a drive input member and a drive output member that are coupled to the valve element for rotating the valve element. A shear member is operatively located within the drive mechanism between the drive input member and the drive output member for shearing in the event the force to rotate the valve element is excessive. The valve has indicia indicating open and closed positions for the valve element. An indicator is mounted to output drive member to properly align with the indicia regardless whether the shear member has sheared or not.

12 Claims, 4 Drawing Sheets

PLUG VALVE INDICATOR

CROSS-REFERENCE TO RELATED APPLICATION

This application claims priority to provisional application Ser. No. 61/183,617, filed Jun. 3, 2009.

FIELD OF THE INVENTION

This invention relates in general to plug valves for flowlines and in particular to an indicator that indicates the position of the plug.

BACKGROUND OF THE INVENTION

In hydraulic fracturing of wells, large pumps are connected to a wellhead by temporary flow lines to pump high volumes of fluid into the well. The pressure is selected to be high enough to cause cracks or fracturing of the earth formation. Valves are employed in the flow lines to control the flow.

One type of valve has a body with a flow passage extending through it that intersects a central cavity. A rotatable valve element, such as a cylindrical plug, is mounted in the cavity. The valve element has a passage that aligns with the passage in the body when open. A drive mechanism is used to rotate the valve element between open and closed positions.

The drive mechanism may have a drive sleeve that is rotated by a hand wheel attached to a worm gear. A drive shaft fits within the bore of the sleeve and has an inner end coupled to the valve element. A shear key inserts between mating grooves between the drive shaft and the drive sleeve. Rotating the hand wheel thus causes the drive shaft to rotate the valve element. The drive mechanism may have a face with indicia to indicate the open or closed position of the valve element. An indicator is mounted to the drive sleeve to align with the indicia.

High fluid pressure within the valve can require considerable force to rotate the hand wheel. If the force is too high, the shear key will shear, allowing the drive sleeve to rotate even though the valve element is not rotating. The indicator may indicate an erroneous position of the valve element because the indicator continues to rotate with the drive sleeve after the shear key shears.

SUMMARY

The valve of this invention has a body having a body passage therethrough intersected by a central cavity. A valve element having a valve passage therethrough is rotatably carried in the cavity for movement between an open position and a closed position. A drive mechanism having a drive input member and a drive output member is coupled to the valve element for rotating the valve element. A shear member is operatively located within the drive mechanism between the drive input member and the drive output member. The shear member shears in the event the force to rotate the valve element is excessive.

Indicia are located on the valve indicating open and closed positions for the valve element. An indicator is cooperatively mounted to valve element so that it is fixed for rotation with the valve element. The indicator points to the correct indicia regardless whether the shear member has sheared or not.

Preferably the indicator is fixed to the drive output member. The indicator may comprise a plate with a pointer, the plate being mounted to an outer end of the drive output member. The drive mechanism includes a housing having a face containing an aperture in one embodiment. The indicia are located on the face of the housing. Preferably, the output drive member comprises a drive shaft having an inner end in driving engagement with the valve element and an outer end extending through the aperture in the housing. The indicator is fixed to the outer end of the drive shaft.

The indicator may comprise a plate secured to the outer end of the drive shaft, the plate having a pointer thereon. The plate may have a circular periphery with an outer diameter greater than the outer end of the drive shaft. In the preferred embodiment, the indicator is positioned farther from the valve element than the face of the housing.

DETAILED DESCRIPTION OF THE INVENTION

Figure 2:
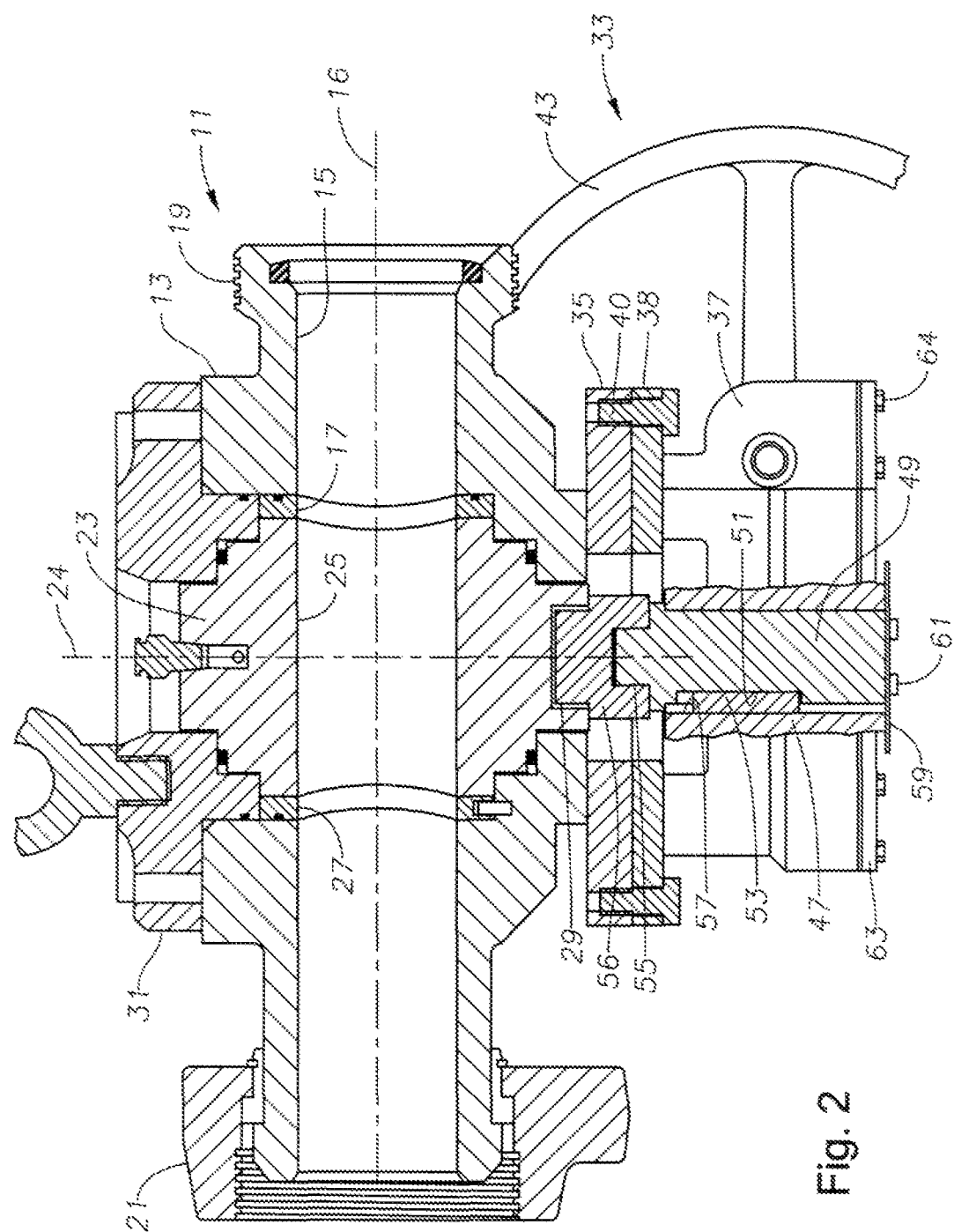
FIG. 2 is a partial sectional view of the plug valve of FIG. 1.

Referring to FIG. 2, in this example, valve 11 is shown as a plug valve. Valve 11 has a body 13 with a flow passage 15 extending through it along an axis 16. A cavity 17 is located in the central portion of flow passage 15. In this example, cavity 17 is cylindrical. Flow passage 15 has opposite ends for securing into a flow line. The ends may be configured in any suitable manner, and in this embodiment, external threads 19 are located on one end and a rotatable coupling sleeve 21 on the other.

A rotatable, cylindrical plug or valve element 23 is located within cylindrical cavity 17. Valve element 23 is a cylindrical member that is rotatable about an axis 24 that is perpendicular to axis 16 of flow passage 15. Valve element 23 has a passage 25 that extends from one side to the other. When in the open position, passage 25 is coaxial with flow passage 15. When in the closed position, passage 25 is perpendicular to flow passage 15, blocking flow through passage 15. Valve element 23 sealingly engages seat rings 27 that are located at each junction of cavity 17 with flow passage 15. Seat rings 27 seal between flow passage 15 and valve element 23. Valve element 23 has a polygonal drive socket 29 on one end. The opposite end of valve element 23 is retained by a retainer plate 31. Retainer plate 31 is secured by fasteners to body 13.

Figure 3:
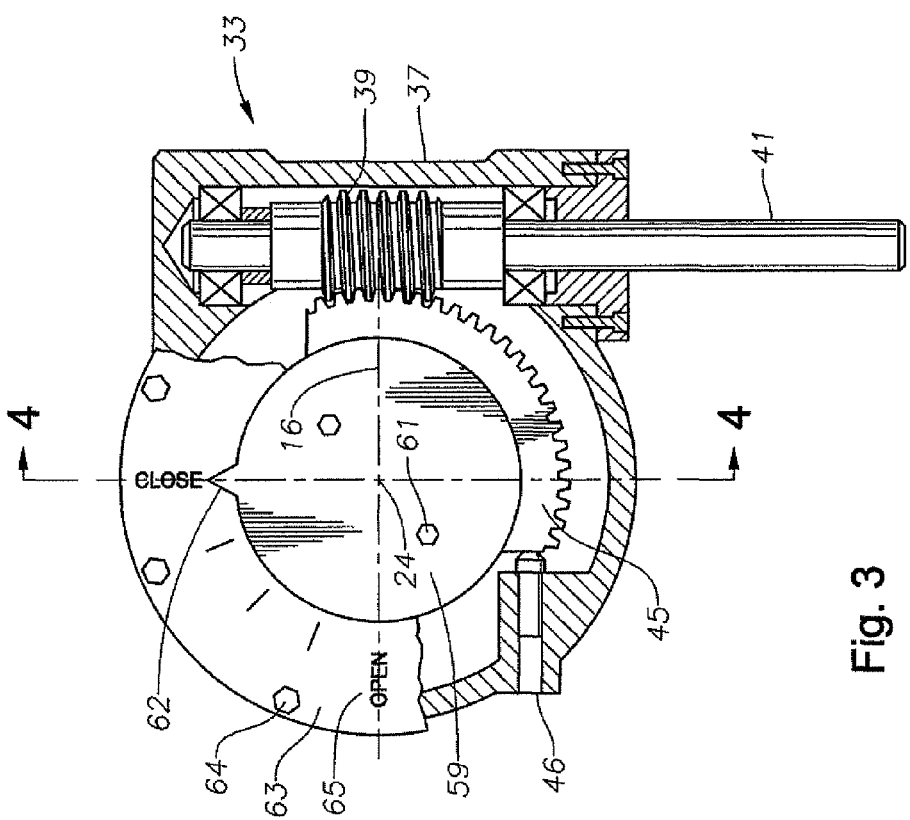
FIG. 3 is a partial sectional view of a portion of the operator for the plug valve of FIG. 1, shown removed from the plug valve.
Figure 7:
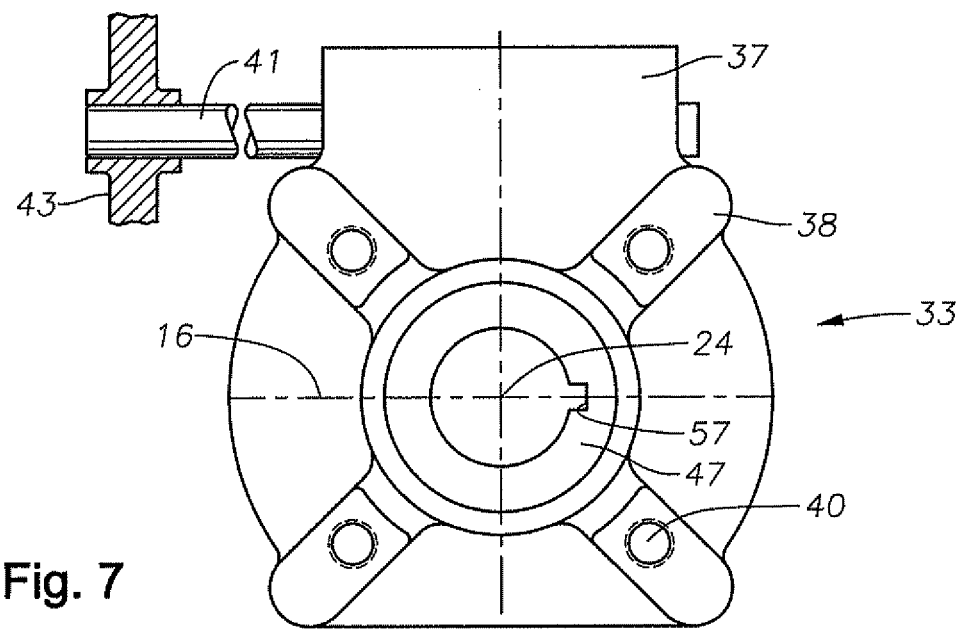
FIG. 7 is a back view of the operator of the plug valve of FIG. 1, shown detached from the plug valve.

A drive mechanism 33 is employed to rotate valve element 23 between open and closed positions. In this embodiment, drive mechanism 33 has a back side that mounts to an adapter plate 35, which in turn is secured to valve body 13 by fasteners (not shown). Drive mechanism 33 has a housing 37 with a base 38 that secures to adapter plate 35 by fasteners 40, shown also in FIG. 7. Referring to FIG. 3, drive mechanism 33 has a gear train that in this embodiment includes a worm gear 39. Worm gear 39 is formed on a shaft 41 that extends forward from housing 37. A hand wheel 43 (FIG. 2) attaches to shaft 41 for rotating worm gear 39. Worm gear 39 meshes with and rotates a gear segment 45, which in this embodiment is a fan-shaped member that extends 90°. Gear segment 45 abuts a stop 46 when rotated 90° in one direction. When rotated 90° in the other direction, it will abut another stop (not shown).

Figure 4:
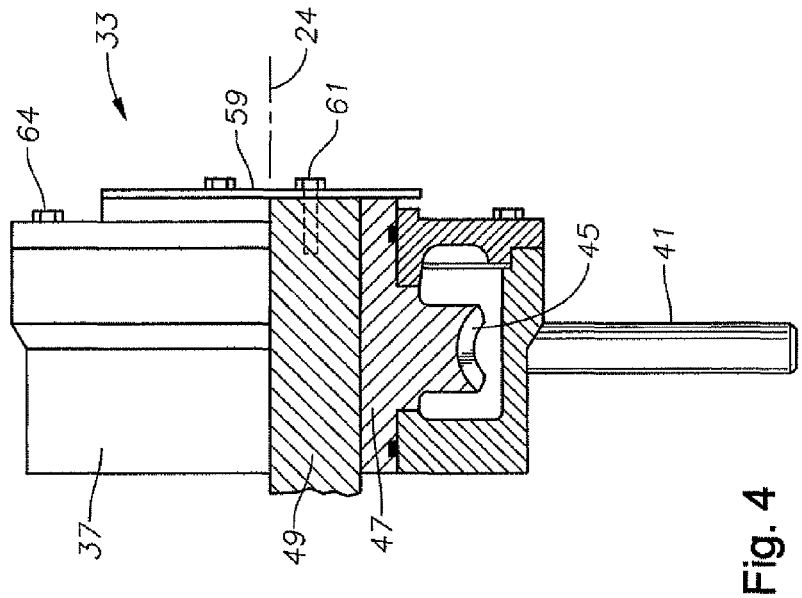
FIG. 4 is another sectional view of the operator of FIG. 3, taken along the line 4-4 of FIG. 3.

As shown in FIG. 4, gear segment 45 is integrally formed or otherwise attached to an input member, such as a gear sleeve 47. Gear sleeve 47 is carried within housing 37 for rotation about axis 24 of valve element 23. An output member, such as drive shaft 49, extends into a central cylindrical bore in gear sleeve 47. Drive shaft 49 has an axially extending groove or keyway 51, shown in FIGS. 2 and 5, that receives a shear key 53 (FIG. 2). Key 53 protrudes from keyway 51 into engagement with a keyway 57 (FIGS. 2 and 7) located in the inner diameter of gear sleeve 47. Key 53 transmits rotation of gear sleeve 47 to drive shaft 49.

Figure 5:
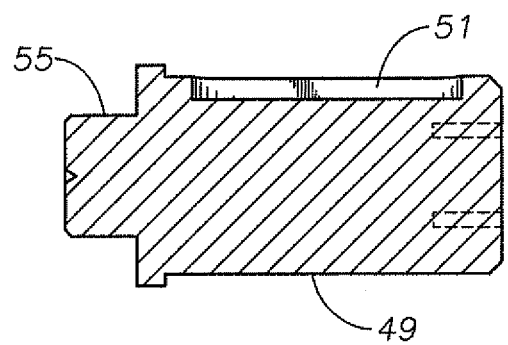
FIG. 5 is a sectional view of the drive shaft for the plug valve of FIG. 1, shown removed from the operator.
Figure 6:
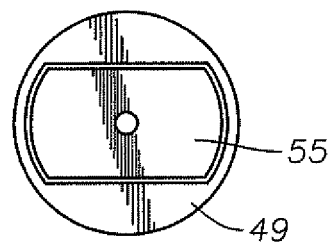
FIG. 6 is an end view of the drive shaft shown in FIG. 5.

Drive shaft 49 has a polygonal drive member 55, shown in FIGS. 5 and 6, on its inner end that engages a polygonal recess in an intermediate or extension drive member 56 (FIG. 2). Extension drive member 56 has an inner end that engages polygonal drive socket 29, as shown in FIG. 2. In this embodiment, drive member 55 has two flat sides, providing a generally rectangular configuration with rounded ends. Other shapes are suitable.

Figure 1:
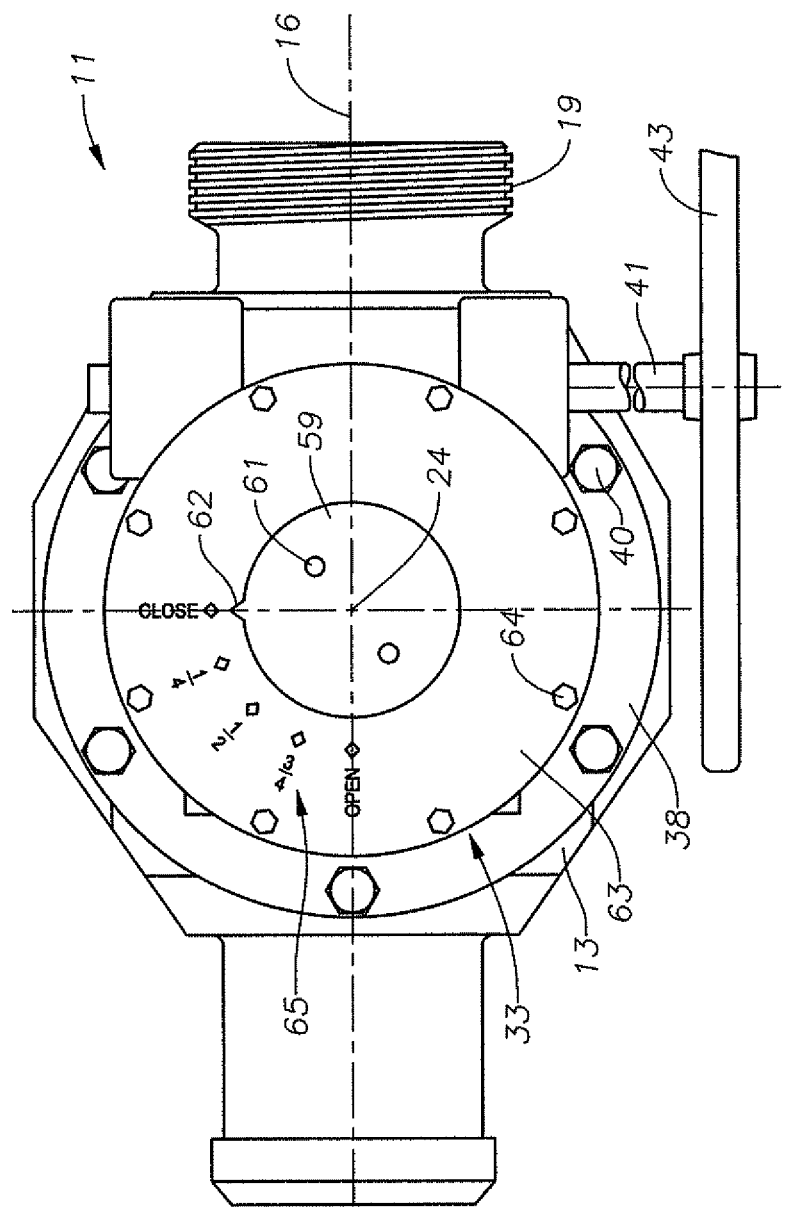
FIG. 1 is a front elevational view of a plug valve constructed in accordance with this invention.

Referring to FIG. 4, a circular, flat indicator plate 59 is secured to the front or outer end of drive shaft 49 by fasteners 61. Indicator plate 59 thus rotates in unison with drive shaft 49. Indicator plate 59 has a pointer 62, shown in FIG. 3, on its circumference. Referring still to FIGS. 3 and 4, a circular non rotatable cover plate 63 is secured by fasteners 64 to the front end of operator housing 37. Cover plate 63 is flat and forms a face for housing 37. Cover plate 63 has a central aperture through which the outer end of drive shaft 49 extends a short distance. Cover plate 63 has a greater outer diameter than indicator plate 59, which is located on a front side of cover plate 63. The outer diameter of indicator plate 59 is greater than the central aperture within cover plate 63. As shown in FIGS. 1 and 3, indicia 65 are placed on the front side of cover plate 63 in a 90 degree array relative to plug axis 24. Pointer 62 points to indicia 65 to inform the operator the particular rotational position of drive shaft 49, and thus the rotational position of valve passage 25 (FIG. 2) relative to flow passage 15.

During operation, when valve 11 is in the closed position, pointer 62 will point toward the portion of indicia 65 indicating that the valve is closed, as shown in FIGS. 1 and 3. When the operator rotates hand wheel 43, worm gear 39 will rotate gear segment 45, causing drive shaft 49 to move from the closed position toward the open position. Indicator plate 59 will rotate in unison with drive shaft 49. If the pressure in flow passage 15 is very high, a significant force may be required to rotate valve element 23 from the open to the closed position. If the force is excessive, key 53 will shear to avoid excessive damage to drive mechanism 33. If key 53 shears, the operator may continue to rotate hand wheel 43, which will continue to cause gear sleeve 47 to rotate. However, drive shaft 49 will not rotate with gear sleeve 47. Indicator plate 59 will not rotate either because it is affixed to drive shaft 49 for rotation therewith. Consequently, the operator will know the exact rotational position of valve element 23 even if key 53 has sheared.

While the invention has been shown in only one of its forms, it should be apparent to those skilled in the art that it is not so limited but is susceptible to various changes without departing from the scope of the invention.

The invention claimed is:

1. A valve, comprising:
a body having a body passage therethrough intersected by a central cavity, the body having a flat side portion with an access opening therethrough;
a valve element having a valve passage therethrough and rotatably carried in the cavity for movement between an open position with the valve passage and the body passage aligned and a closed position, the valve element having an end within the access opening, the end having a drive socket formed therein;
an adapter plate secured to the side portion of the body, the adapter plate having a central opening in alignment with the access opening, the adapter plate having a periphery that extends literally past a periphery of the side portion, relative to an axis of rotation of the valve element;
a drive mechanism housing having an inner side wall that abuts and is fastened to an outer side of the adapter plate, the inner side wall of the housing having an inner aide opening in alignment with the central opening and the access opening, the housing having an outer side with an outer side opening, the inner side wall of the housing having a periphery substantially co-extensive with the periphery of the adapter plate;
a drive sleeve rotatably mounted in the housing and having an outer end protruding through the outer side opening of the housing;
a drive mechanism operably coupled to the drive sleeve for rotating the drive sleeve;
a drive shaft mounted in the drive sleeve, the drive shaft having an inner end protruding from the drive sleeve into the inner side opening of the housing, the drive shaft having an outer end protruding through the outer side opening of the housing;
an extension member having an outer end with a receptacle that receives the inner end of the drive shaft, the extension member extending through the central opening of the adapter plate and having an inner end that inserts into the drive socket of the valve element for rotating the valve element;
a shear member between the drive sleeve and the drive shaft that causes rotation of the drive shaft in unison with the drive sleeve and shears in the event the force to rotate the valve element is excessive, resulting in the drive sleeve being rotatable relative to the drive shaft;
indicia at the outer side of the housing indicating open and closed positions for the valve element; and
an indicator mounted to the outer end of the drive shaft of rotation therewith, the indicator aligning with the indicia, the drive sleeve being rotatable relative to the indicator in the event the shear member has sheared.

2. The valve according to claim 1, wherein:
the outer end of the drive shaft protrudes past the outer side of the housing at least as far as the outer end of the drive sleeve.

3. The valve according to claim 1, wherein;
the indicator comprises a circular plate with a circumference having a pointer, the plate being mounted to the outer end of the drive shaft.

4. The valve according to claim 1, wherein:
the drive sleeve has an inner end located within the inner side opening of the housing.

5. The valve according to claim 1, wherein the end of the drive shaft protrudes into the central opening of the adapter plate and is spaced outward from the access opening in the body.

6. The valve according to claim 1, wherein:
the indicator comprises an indicator plate with a circular periphery having a pointer extending therefrom, the indicator plate being mounted to the outer end of the drive shaft; and the circular periphery of the indicator plate has an outer diameter greater than an outer diameter of the outer end of the drive shaft.

7. The valve according to claim 5, wherein the inner end of the drive shaft and the receptacle of the extension member are polygonal.

8. A valve, comprising:
a body having a body passage therethrough intersected by a cavity, the body having a flat outer side portion;
a valve element having a valve element passage and rotatably carried in the cavity for movement between an open position with the valve element and body passages aligned and a closed position;
a drive mechanism housing having an inner side wall that is secured to the body, the housing having an inner side opening in the inner side wall, the housing having an outer side wall with a face having a face opening;
a drive sleeve having a bore and rotatably mounted in the housing, the drive sleeve having an outer end extending through the face opening past the face of the housing;
a drive mechanism operably coupled to the drive sleeve for rotating the drive sleeve;
a drive shaft located within the bore of the drive sleeve, the drive shaft having an inner end cooperatively coupled with the valve element for rotating the valve element in response to rotation of the output shaft, the drive shaft having an outer end that protrudes through the face opening of the housing at least as far as the outer end of the drive sleeve;
a shear member and keyway located between the drive sleeve and the drive shaft, the shear member allowing rotation of the drive sleeve relative to the drive shaft if the shear members shears;
indicia at the face adjacent the face opening indicating open and closed positions for the valve element; and
an indicator secured to the outer end of the drive shaft for rotation therewith, the indicator aligning with the indicia to indicate the position of the valve element.

9. The valve according to claim 8, wherein the drive sleeve has an inner end that is located within the inner side opening of the housing.

10. In a valve having a body with a body passage therethrough intersected by a cylindrical cavity, and a cylindrical valve element having a valve element passage and rotatably carried in the cavity for movement between an open position with the valve element and body passages aligned and a closed position, the body having a flat outer side portion with an access opening, the valve element having an end within the access opening, the end of the valve element having a drive socket formed therein, the improvement comprising:
an adapter plate having an inner side mounted to the outer side portion of the body with a central opening aligned with the access opening;
a drive mechanism housing having an inner side wall in abutment with and secured to an outer side of the adapter plate, the inner side wall of the housing having an inner side opening in alignment with the access opening, the housing having an outer side wall with a face opposite the inner side wall and an outer side opening at the face;
a drive sleeve within the housing having a bore, an inner end within the inner side opening of the housing and an outer end extending through the outer side opening of the housing;
a drive mechanism operably coupled with the drive sleeve for rotating the drive sleeve;
a drive shaft located within the bore of the drive sleeve, the drive shaft having an inner end cooperatively coupled with the valve element for rotating the valve element in response to rotation of the drive shaft, the drive shaft extending into the central opening of the adapter plate, the drive shaft having an outer end extending through the outer side opening of the housing;
a shear member located in mating keyways between the drive sleeve and the drive shaft, the shear member allowing rotation of the drive sleeve relative to the drive shaft if the shear members shears;
indicia at the face adjacent the outer side opening indicating open and closed positions for the valve element; and
an indicator fixed to the outer end of the drive shaft for rotation therewith, the indicator aligning with the indicia to indicate the position of the valve element.

11. The valve according to claim 10, wherein:
the outer end of the shaft extends past the face at least as far as the input sleeve.

12. The valve according to claim 10, wherein:
the inner side wall of the housing has a periphery substantially co-extensive with a periphery of the adapter plate.

\* \* \* \* \*